United States Patent
Naoi

(10) Patent No.: US 11,831,416 B2
(45) Date of Patent: Nov. 28, 2023

(54) SENDING DEVICE, SENDING METHOD, AND SENDING PROGRAM

(71) Applicant: Rakuten Group, Inc., Tokyo (JP)

(72) Inventor: Kazuhisa Naoi, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 671 days.

(21) Appl. No.: 16/499,552

(22) PCT Filed: Sep. 11, 2018

(86) PCT No.: PCT/JP2018/033685
§ 371 (c)(1),
(2) Date: Sep. 30, 2019

(87) PCT Pub. No.: WO2020/053971
PCT Pub. Date: Mar. 19, 2020

(65) Prior Publication Data
US 2021/0336911 A1 Oct. 28, 2021

(51) Int. Cl.
*H04L 51/066* (2022.01)
*H04L 51/04* (2022.01)
(Continued)

(52) U.S. Cl.
CPC ............ *H04L 51/066* (2013.01); *H04L 51/04* (2013.01); *H04L 51/10* (2013.01); *H04L 51/21* (2022.05); *H04L 51/214* (2022.05); *H04L 51/216* (2022.05)

(58) Field of Classification Search
CPC ..... H04L 51/066; H04L 51/04; H04L 65/066; H04L 65/04; H04L 65/07; H04L 65/21;
(Continued)

(56) References Cited

U.S. PATENT DOCUMENTS 7,847,755 B1 * 12/2010 Hardebeck .............. G06F 9/452
709/236
11,691,882 B2 * 7/2023 Kuhn ...................... B01J 21/00
502/328
(Continued)

FOREIGN PATENT DOCUMENTS

CA 1340450 C * 3/1999 ............. B60R 11/02
CA 3095425 A1 * 10/2019 ........... H04L 69/324
(Continued)

OTHER PUBLICATIONS

International Search Report for PCT/JP2018/033685, dated Oct. 16, 2018.

*Primary Examiner* — Khanh Q Dinh
(74) *Attorney, Agent, or Firm* — Sughrue Mion, PLLC

(57) ABSTRACT

A sending device divides a message that is to be sent to a receiving device into a plurality of partial messages each having a length equal to or less than a predetermined length. The sending device puts the plurality of partial messages in a queue. The sending device takes one partial message out of the queue among the plurality of partial messages and sends the one partial message to the receiving device. The sending device receives notification information indicating that the sent partial message has been displayed in a display area. The sending device takes a next partial message out of the queue among the plurality of partial messages and sends the next partial message to the receiving device after the notification information is received.

14 Claims, 7 Drawing Sheets

(51) Int. Cl.
*H04L 51/21* (2022.01)
*H04L 51/10* (2022.01)
*H04L 51/214* (2022.01)
*H04L 51/216* (2022.01)

(58) Field of Classification Search
CPC ..... H04L 65/216; H04L 65/234; H04L 65/58; H04L 51/10; H04L 51/21; H04L 51/214; H04L 51/216; H04L 51/58
USPC .......................... 709/206, 220, 224, 226, 228
See application file for complete search history.

(56) References Cited

U.S. PATENT DOCUMENTS

| | | | | | |
|---|---|---|---|---|---|
| 11,693,156 | B2* | 7/2023 | Kajiya | ............. | B29D 11/00288 |
| | | | | | 359/601 |
| 11,693,232 | B2* | 7/2023 | Han | ........................ | G02B 26/10 |
| | | | | | 359/206.1 |
| 11,693,827 | B2* | 7/2023 | Mazukabzov | ........ | G06F 16/282 |
| | | | | | 707/624 |
| 11,693,945 | B2* | 7/2023 | Engler | .................. | G06F 16/951 |
| | | | | | 726/7 |
| 11,695,657 | B2* | 7/2023 | Clemm | .................... | H04L 43/04 |
| | | | | | 709/224 |
| 2011/0041085 | A1* | 2/2011 | Hardebeck | ............ | G06F 3/1454 |
| | | | | | 715/753 |
| 2011/0214088 | A1* | 9/2011 | Sandru | .................... | G09G 5/346 |
| | | | | | 455/566 |
| 2014/0324959 | A1* | 10/2014 | Hudson | ............... | H04L 47/6215 |
| | | | | | 709/203 |
| 2014/0324999 | A1* | 10/2014 | Dan | ........................ | H04L 51/42 |
| | | | | | 709/206 |
| 2017/0011606 | A1* | 1/2017 | Ceccon | .................... | G06Q 20/18 |
| 2017/0265046 | A1* | 9/2017 | Chen | .................... | H04W 12/50 |
| 2020/0310858 | A1* | 10/2020 | Ren | ..................... | G06F 9/45558 |

FOREIGN PATENT DOCUMENTS

| | | | |
|---|---|---|---|
| CN | 104821889 A | * | 8/2015 |
| JP | 2002-247102 A | | 8/2002 |
| JP | 2004140730 A | | 5/2004 |
| JP | 2014-102808 A | | 6/2014 |
| JP | 2014-225268 A | | 12/2014 |
| JP | 2015210646 A | | 11/2015 |
| KR | 10-2004-0022364 A | | 3/2004 |

* cited by examiner

SENDING DEVICE, SENDING METHOD, AND SENDING PROGRAM

CROSS REFERENCE TO RELATED APPLICATIONS

This application is a National Stage of International Application No. PCT/JP2018/033685 filed Sep. 11, 2018.

TECHNICAL FIELD

The present invention relates to techniques of sending messages, and in particular relates to a device and a method for sending the messages to a receiving device that scrolls through messages in an area for displaying the messages such that the messages can be viewed.

BACKGROUND ART

Conventionally, instant messengers for terminal devices, such as mobile devices, exchanging messages with each other are widely used. In these instant messengers, when a message is sent from a terminal device, a terminal device to which it is sent immediately receives this message in general. The terminal device that has received the message automatically performing scrolling such that the end of this message is positioned at the bottom of a display area. It enables a user to read the newest message.

In Addition, as tools for distributing information using the instant messenger or conversation partners, Internet bots that automatically send messages have come into existence. For example, Patent Literature 1 discloses that a software bot replies a response message corresponding to a message sent from a user.

CITATION LIST

Patent Literature

Patent Literature 1: JP 2014-225268 A

SUMMARY OF INVENTION

Technical Problem

While the instant messengers are often used to send relative shorter message, they can be also used to send longer messages. However, when a message is longer than that can be displayed in a size of a display area of a terminal device on the receiving side, it can only display a part of the message at once. Therefore, a user has to manually scroll through the message to read the received message from the beginning.

The present invention is provided in view of the forgoing points and an object of the present invention is to provide a sending device, a sending method, and sending program that send a message such that a user can see the whole of the message at a terminal on the receiving side without manual scrolling.

Solution to Problem

In order to solve the above problem, an aspect of an embodiment includes sending device for sending a message to a receiving device that automatically performs scrolling such that at least the end of a new message is positioned in a display area when receiving the message, the sending device comprising: a dividing means that divides a message that is to be sent to the receiving device into a plurality of partial messages each having a length equal to or less than a predetermined length; an enqueuing means that puts the plurality of partial messages in a queue; a first sending means that takes one partial message out of the queue among the plurality of partial messages and sends the one partial message to the receiving device; a receiving means that receives notification information indicating that the sent partial message has been displayed in the display area; and an second sending means that takes a next partial message out of the queue among the plurality of partial messages and sends the next partial message to the receiving device after the notification information is received.

According to this invention, by dividing an original message, it is possible to generate a plurality of partial messages each having a length that makes it possible to display the whole of the respective message in a display area. Furthermore, it is possible to maintain an order of the plurality of partial messages in the original message because the plurality of partial messages are put into a queue, taken out of the queue one by one and sent. The whole of the sent message is displayed in the display area at once by the receiving device automatic scrolling. It is certain that the partial message sent first is fully displayed in the display area before the receiving device receives and displays the next message, because the next message is sent after notification information is received. After that, the next message is fully displayed in the display area. Therefore, a user can see each partial message completely. As a result, the user can substantially see the whole of the original message without manual scrolling.

The invention according to claim 2 is the message sending device according to claim 1, further comprising: a history obtaining means that obtains a history of operations by a user with respect to an instant messenger in the receiving device; and a time determining means that determines based on the obtained history a time until sending the next partial message, wherein the second sending means sends the next partial message the determined time or more after the notification information is received.

According to this invention, how long to wait to send a next message after receiving notification information is determined based on a history of operations by a user with respect to an instant messenger. This time corresponds to a time that elapses after a first partial message is displayed in a display area and before the next partial message is displayed on the display area. Therefore, it is possible to appropriately determine for each user a timing of sending the next message. As a result, it is possible to increase a probability that the receiving device displays the next partial message after the user finishes reading the first partial message.

The invention according to claim 3 is the sending device according to claim 1 or 2, further comprising: a size information obtaining means that obtains size information indicating a size of the display area; and a length determining means that determines based on the received size information an upper limit of a length per partial message, wherein the dividing means divides the message into the plurality of partial messages according to the determined upper limit of the length.

According to this invention, when sizes of display areas vary depending on receiving devices, it is possible to divide an original message into partial messages that each have a suitable length according to a size of a display area.

The invention according to claim 4 is the sending device according to any one of claims 1 to 3, wherein the dividing means divides the message into the plurality of partial messages when a length of the message that is to be sent to the receiving device is more than a second predetermined length, and the first sending means sends the message to the receiving device without the dividing means dividing the message when the length of the message that is to be sent to the receiving device is less than the second predetermined length.

According to this invention, when a length of an original message is a length that makes it possible to display the whole of this message in a display area at once, a receiving device can display the whole of the original message at once.

The invention according to claim 5 is the sending device according to any one of claims 1 to 4, wherein the receiving means further receives notification information indicating that the next partial message sent by the second sending means has been displayed in the display area, and the reception of the notification information by the receiving means and the transmission of the partial message by the second sending means are repeated until the queue becomes empty.

According to this invention, when an original message has been divided into three or more partial messages, each partial message is displayed in a display area completely. Therefore, a user can substantially see the whole of the original message without manual scrolling.

The invention according to claim 6 is a sending method executed by a computer in a sending device for sending a message to a receiving device that automatically performs scrolling such that at least the end of a new message is positioned in a display area when receiving the message, the sending method comprising: a dividing step of dividing a message that is to be sent to the receiving device into a plurality of partial messages each having a length equal to or less than a predetermined length; an enqueuing step of putting the plurality of partial messages in a queue; a first sending step of taking one partial message out of the queue among the plurality of partial messages and sending the one partial message to the receiving device; a receiving step of receiving notification information indicating that the sent partial message has been displayed in the display area; and an second sending step of taking a next partial message out of the queue among the plurality of partial messages and sending the next partial message to the receiving device after the notification information is received.

The invention according to claim 7 is a sending program for causing a computer in a sending device for sending a message to a receiving device that automatically performs scrolling such that at least the end of a new message is positioned in a display area when receiving the message to function as: a dividing means that divides a message that is to be sent to the receiving device into a plurality of partial messages each having a length equal to or less than a predetermined length; an enqueuing means that puts the plurality of partial messages in a queue; a first sending means that takes one partial message out of the queue among the plurality of partial messages and sends the one partial message to the receiving device; a receiving means that receives notification information indicating that the sent partial message has been displayed in the display area; and an second sending means that takes a next partial message out of the queue among the plurality of partial messages and sends the next partial message to the receiving device after the notification information is received.

Advantageous Effects of Invention

According to the present invention, a user can see each partial message from the beginning to the end of this partial message at once. As a result, the user can substantially see the whole of the original message without manual scrolling.

DESCRIPTION OF EMBODIMENTS

The following describes embodiments of the present invention in detail with reference to the drawings. The embodiments described below are embodiments in which the present invention is applied to a messaging system for terminal devices sending and receiving messages with each other using instant messengers.

1. First Embodiment

[1-1. Configuration of Messaging System]

Figure 1:
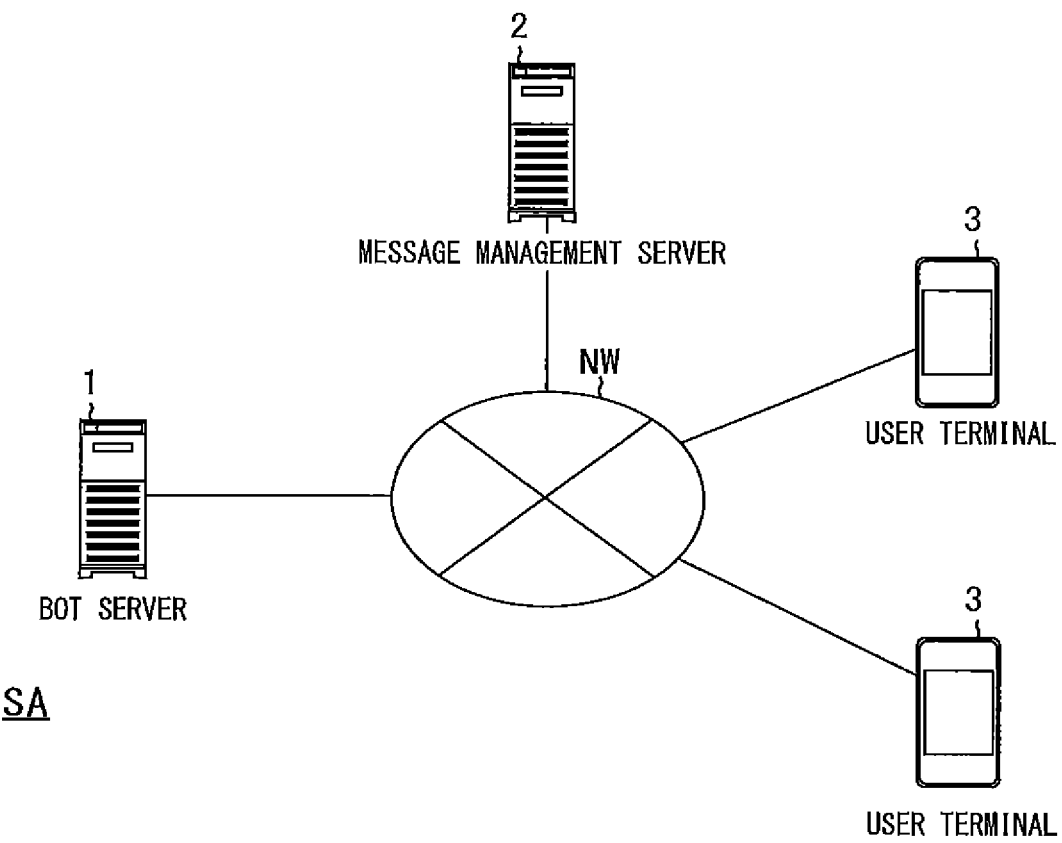
FIG. 1 is diagram schematically illustrating an example configuration of a messaging system SA according to one embodiment.

First, a configuration of a messaging system SA according to this embodiment is described with reference to FIG. 1. FIG. 1 is diagram schematically illustrating an example configuration of a messaging system SA according to one embodiment.

As shown in FIG. 1, the messaging system SA includes at least one bot server 1, a message management server 2, and a plurality of user terminals 3. The bot server 1, the message management server 2, and the user terminals 3 are capable of transmitting and receiving data with each other over a network NW using communication protocols, such as TCP/IP. The network NW includes, for example, the Internet, dedicated communication lines (e.g., community antenna television (CATV) line), mobile communication networks (including base stations), and gateways.

Each user terminal 3 is a terminal device used by a user who has an account for using the messaging system SA. As examples of the user terminal 3, a mobile information terminal such as a smartphone and a tablet computer, a mobile phone, a personal digital assistant (PDA) and a personal computer are listed. Into each user terminal 3, an instant messenger has been installed. The user terminal 3 sends a message input by a user to a user terminal 3 or bot server 1 that is a destination through the message management server 2. In each user's instant messenger, a plurality of display areas can be switched and displayed, for example. For example, in a message display area for each account added as one of user's friends (another user or bot server 1), messages exchanged with that account are displayed. This message display area may be the whole of a display screen of the user terminal 3 or a part of that screen. When the user terminal 3 has received a message or the user has inputted the message, the user terminal 3 controls the screen such that at least the end of the most newly received or inputted message is displayed in the display area. For example, the user terminal 3 automatically scrolls through the newest message and past messages to move all of them up and positions the end of the newest message at the bottom of the message display area. The user can see also a past message by scrolling through the messages in the message display area. Scrolling through the messages may be performed pixel by pixel or line by line. However, while the whole of the newest message is displayed when the message is short, only a part of the newest message may be displayed when the message is long. In order to see the beginning of the long message, the user has to manually scroll through the message. Therefore, the burden of the operation on the user will increase and it is difficult to view the message quickly.

Figure 2:
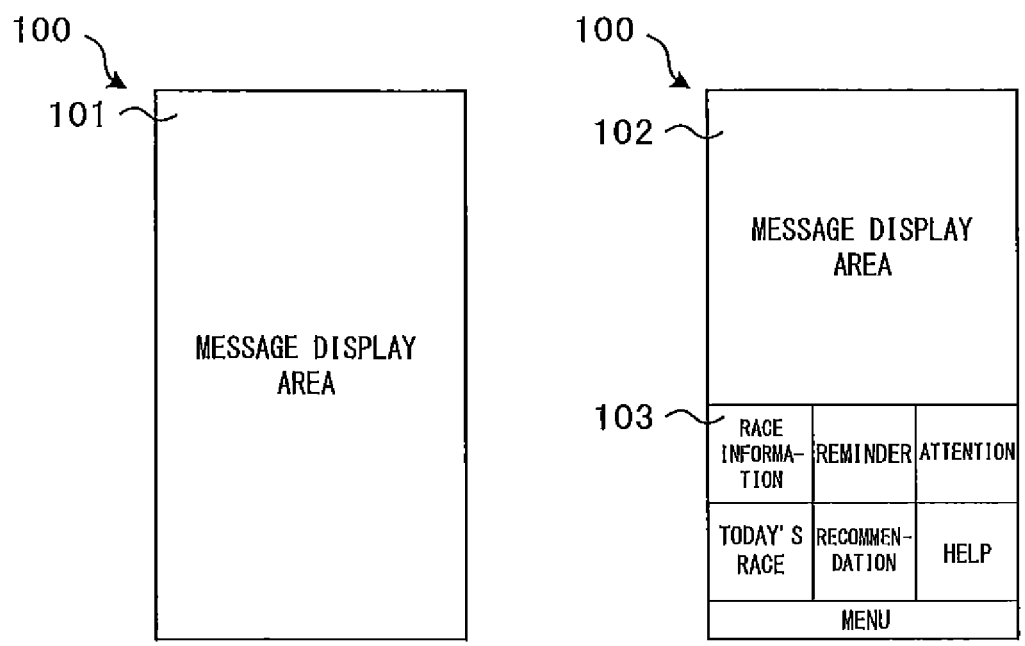
FIG. 2 is a diagram illustrating an example of a difference between message display areas.

The bot server 1 is a server device or a personal computer that automatically sends messages to a user terminal 3 through the message management server 2. Into the bot server 1, an internet bot has been installed. A user using a user terminal 3 adds a message service provided by the bot server 1 (one of accounts in the messaging system SA) as his/her friend for example, and thereby the user terminal 3 can exchange messages with the bot server 1. The bot server 1 may provide the user with information or may talk automatically with the user through the messages, for example. The bot server 1 may send a message corresponding to a received message when receiving the message from the user terminal 3 or may send a message at a predetermined timing or regularly, for example. An administrator of the bot server 1 may set a dedicated menu for the message service provided by the bot server 1. This dedicated menu is displayed, for example, at the bottom of the message display area for displaying messages exchanged with bot server 1, in an instant messenger of a user terminal 3. If the dedicated menu is displayed, an area except the dedicated menu in a screen for the instant messenger is the message display area. FIG. 2 is a diagram illustrating an example of a difference between message display areas. As shown in FIG. 2, when the dedicated menu is not displayed on a screen 101, the whole of the screen 101 is the message display area. When the dedicated menu 103 is displayed on the screen 101, the whole of the screen 101 is divided into message display area 102 and the dedicated menu 103. When a user selects any one item in the dedicated menu, the user terminal 3, for example, may access a website outside or may input a predetermined message automatically. The dedicated menu may be displayed at all times, or may be visible or hidden according to the user switching operation. Information for displaying the dedicated menu may have been input into the message management server 2 in advance by the administrator of the bot server 1. In order to reduce the burden of the operation on the user caused by a long message, the bot server 1 sometimes divide the message that should be sent to a user terminal 3 into a plurality of partial messages. The bot server 1 sends the plurality of partial messages one by one.

The message management server 2 is a server device that relays messages exchanged between user terminals 3. In addition, the message management server 2 relays messages between the bot server 1 and a user terminal 3. When receiving a message from any user terminal 3 or the bot server 1, the message management server 2 forwards the message to a user terminal 3 or the bot server 1 that is the destination. When the message is displayed in a message display area of an instant messenger in a user terminal 3 to which it has been forwarded, the message management server 2 may receive read information from the user terminal 3. The read information is information notifying that a message received by a user terminal 3 has been displayed in a message display area of the user terminal 3. The message management server 2 forward the received read information to the user terminal 3 or the bot server 1 that has sent the message. When the display area for messages exchanged between the bot server 1 is displayed, the message management server 2 may cause a user terminal 3 to display the dedicated menu. The message management server 2 may also serve as the bot server 1.

[1-2. Configuration of Bot Server]

Figure 3A:
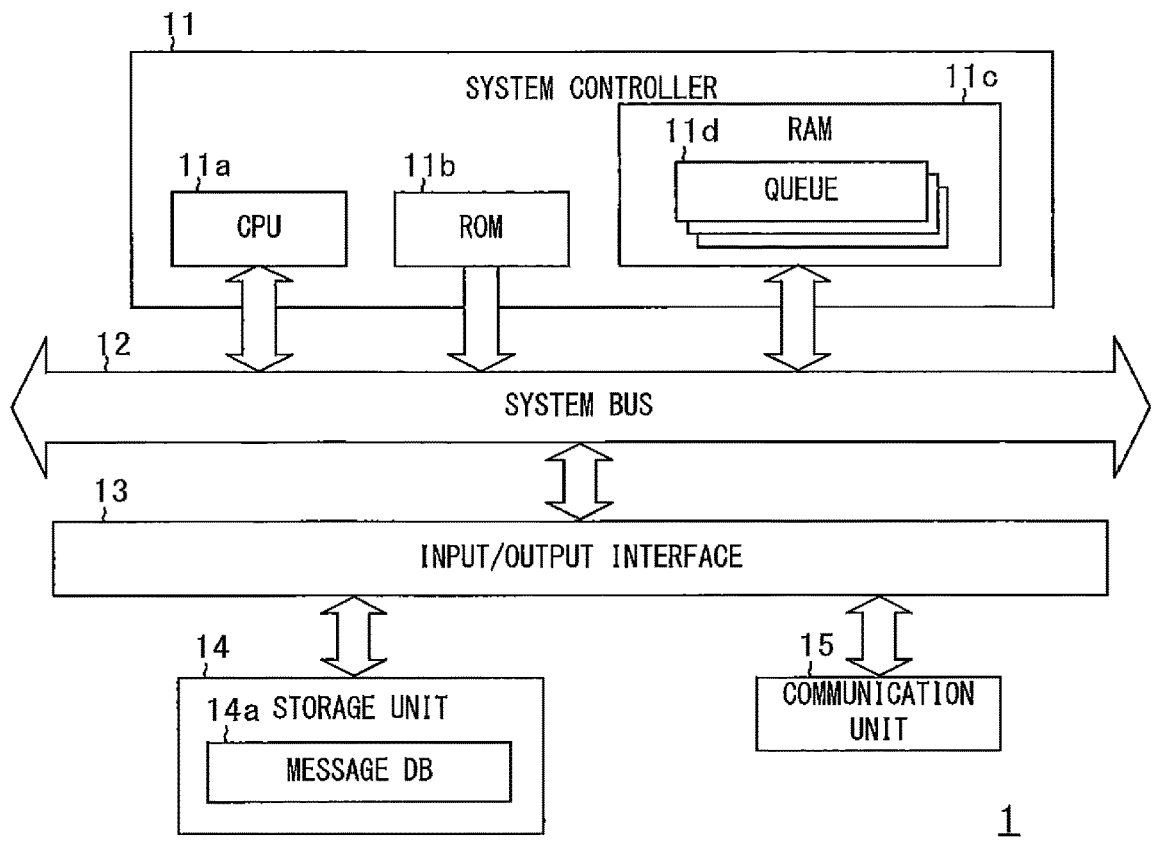
FIG. 3A is a block diagram schematically illustrating an example configuration of a bot server 1 according to one embodiment.

The following describes a configuration of the bot server 1 with reference to FIG. 3A. FIG. 3A is a block diagram schematically illustrating an example configuration of the bot server 1 according to one embodiment. As shown in FIG. 3A, the bot server 1 includes a system controller 11, a system bus 12, an input/output interface 13, a storage unit 14, and a communication unit 15. The system controller 11 and the input/output interface 13 are connected via a system bus 13.

The system controller 11 includes a central processing unit (CPU) 11a, a read only memory (ROM) 11b, a random access memory (RAM) 11c, and so forth. The CPU 11a is an example of a processor. The present invention can also be applied to various processors that differ from CPUs. The storage unit 14, the ROM 11b, and the RAM 11c are each an example of a memory. The present invention can be applied to various memories that differ from hard disks, ROMs, and RAMs. In the RAM 11c, a queue 11d that stores a plurality of partial messages generated by dividing a message that should be sent to a user terminal is stored temporally, as described later.

The input/output interface 13 performs interface processing between the storage unit 14 and the communication unit 15, and the system controller 11.

The storage unit 14 includes, for example, hard disk drives. The storage unit 14 stores for example a message database (DB) 14a. In the message DB 14a, messages themselves that are to be sent to user terminals 3 or information such as character strings that is to be elements of a message are stored. According to a message received from a user terminal 3 or a situation, the system controller 11 obtains from the message database 14a a message that is to be sent or uses information stored in the message database 14a to generate a message that is to be sent. The storage unit 14 also stores various programs, such as an operating system, an internet bot program. Each code included in the Internet bot program causes the CPU 11a to perform functions described later. The internet bot program may be available from, for example, another server device over the network NW, or may be recorded in a recording medium, such as a magnetic tape, an optical disk, or a memory card and be read via a drive device.

The communication unit 15 connects to the network NW and controls the state of communications with the message management server 2 and the user terminals 3.

[1-3. Functional Overview]

The following describes a functional overview of the system controller 11 of the bot server 1 with reference to FIGS. 3B to 5.

Figure 3B:
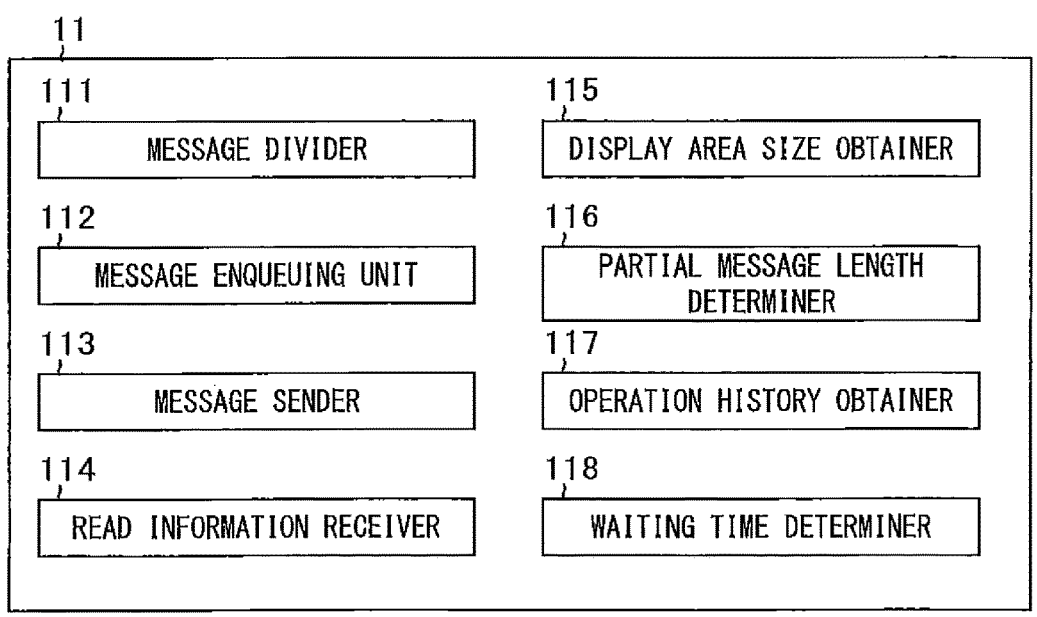
FIG. 3B is a diagram illustrating an example of functional blocks of a system controller 11 of a bot server 1 according to one embodiment.

FIG. 3B is a diagram illustrating an example of functional blocks of the system controller 11 of the bot server 1 according to one embodiment. The CPU 11a reads and executes various codes included in the internet bot program and, as show in FIG. 3B, thereby the system controller 11 functions as at least a message divider 111, a message enqueuing unit 112, a message sender 113 and a read information receiver 114. In addition, the system controller 11 may function as a display area size obtainer 115, a partial message length determiner 116, an operation history obtainer 117 and a waiting time determiner 118.

Figure 4A:
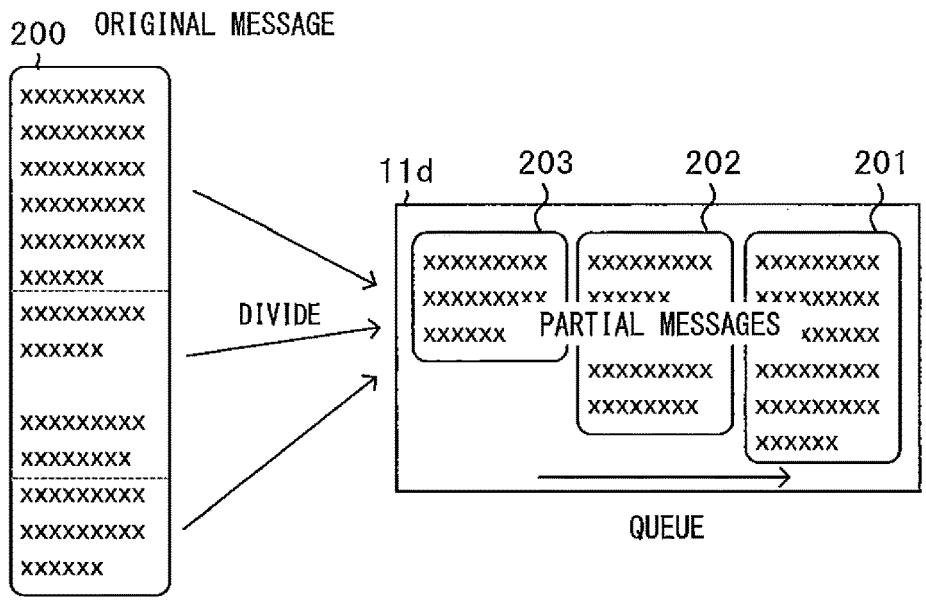
FIG. 4A is a diagram illustrating an example of a way in which a message is divided.

The message divider 111 divides an original message generated or obtained as a message that should be sent to a user terminal 3 into a plurality of partial messages each having a length equal to or less than a predetermined partial message length upper limit. FIG. 4A is a diagram illustrating an example of a way in which a message is divided. For example, as shown in FIG. 4A, an original message 300 is divided into three partial messages 201 to 203. The partial messages 201, 202 and 203 are a beginning part, a middle part and an end part respectively. The number of partial messages is required to be two or more.

The message divider 111 may divide the original message at points that are freely determined. However, it is desirable that the message divider 111 divide the message into sets of character strings that are each easy to read for a user. For example, message divider 111 may divide the messages at a predetermined mark or character. As examples of the predetermined mark or character, a comma, a period, a parenthesis, a quotation mark, a question mark, an exclamation mark, a space, a colon, a semicolon are listed. Alternatively, for example, the message divider 111 may analyze the message morphologically to identify phrases, sentences or so on, and thereby may divide the message into sets of phrases, sentences or so on.

The partial message length upper limit is an upper limit of a length per partial message. When the partial message length upper limit is denoted by UL and a length of a message that can be displayed in a message display area of a user terminal 3 is denoted by SZ, the partial message length upper limit is determined such that it satisfies UL SZ. The partial message length upper limit ensures that each partial message is displayed in the message display area completely. The partial message length upper limit may be represented by the number of characters, the number of lines, or other measures. The partial message length upper limit may be preset according to a user terminal 3 that has the smallest size of the message display area among all types of user terminals 3.

Any actual shorter length of each partial message is acceptable as long as it is equal to or shorter than the partial message length upper limit. Any of partial messages may include a new paragraph in the middle when an original message includes the new paragraph. In this case, a blank would appear in the middle of the partial message when the partial message is displayed in the message display area. The message divider 111 may adjust a length of each partial message by taking into account blanks that may appear so that each partial message is displayed in the message display completely.

The message divider 111 may divide an original message when the length of the original message is longer than a predetermined threshold. When the threshold is denoted by TH, the threshold is determined such that it satisfies UL≤TH≤SZ. When the threshold and the partial message length upper limit are the same, the threshold may serve as the partial message length upper limit. When the length of the original message is equal to or less than the threshold, the message sender 113 sends the original message as it is without dividing the message by the message divider 111. The user can read the message quickly since unnecessary division is not performed.

At least the partial message length upper limit between the partial message length upper limit and the threshold may be determined according to a user terminal 3 to which the message will be sent. For that purpose, the display area size obtainer 115 obtains size information indicating the size of the message display area in the user terminal 3. As examples of the size information, the size of the message display area itself, user agent information, information indicating a model of the user terminal 3, and other information indirectly indicating the size are listed. If the message management server 2 serves as the bot server 1, the display area size obtainer 115 can receive the size information directly from the user terminal 3. If the bot server 1 is different to the message management server 2 but the size information can be obtained by using an application programing interface (API) or so on provided by the message management server 2 for the instant messaging, the display area size obtainer 115 obtains the size information by using it. For example, the message management server 2 has caused the dedicated menu to be displayed on a user terminal 3 that displays a message display area for the bot server 1, the message management server 2 may send information indicating coordinates of the dedicated menu in the message display area (for example, coordinates of each vertex of the dedicated menu) to the bot server 1. For example, if the dedicated menu is displayed at the bottom of the message display area, the display area size obtainer 115 can identify the size of the message display area from coordinates of a lower-right vertex of the dedicated menu. Alternatively, the display area size obtainer 115 can identify the size of the message display area that excludes an area occupied by the dedicated menu from coordinates of a higher-left vertex of the dedicated menu. The display area size obtainer 115 may obtain the size information each time when a message to be sent to the user terminal 3 has been generated or obtained. Alternatively, the display area size obtainer 115 stores the size information obtained once in storage unit 14 in association with identification information for identifying an account of a user to whom the message will be sent. After that, the display area size obtainer 115 may obtain the size information from the storage unit 14.

The partial message length determiner 116 determines at least the partial message length upper limit between the partial message length upper limit and the threshold based on the size information obtained by the display area size obtainer 115. As described before, the partial message length determiner 116 determines the partial message length upper limit such that it satisfies UL≤SZ. If determining both of the partial message length upper limit and the threshold, The partial message length determiner 116 determines the partial message length upper limit and the threshold such that it satisfies UL≤TH≤SZ.

Figure 4B:
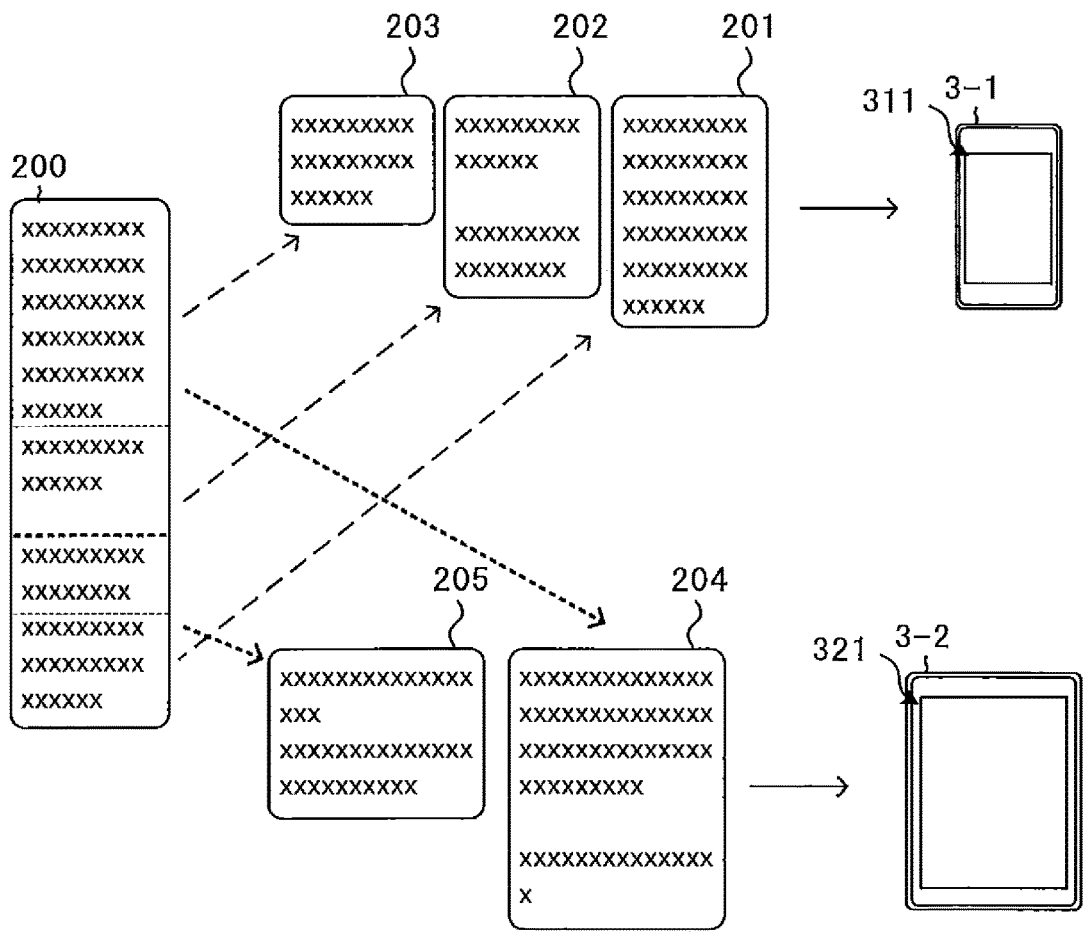
FIG. 4B is a diagram illustrating an example of a difference between lengths of partial messages according to a difference between sizes of message display areas.

The message divider 111 divides the original message into the plurality of partial messages according to the determined partial message length upper limit. FIG. 4B is a diagram illustrating an example of a difference between lengths of partial messages according to a difference between sizes of message display areas. FIG. 4 illustrates a user terminal 3-1 and 3-2 as examples of the user terminal 3. The user terminal 3-1 is a terminal device that has a relatively small display size, such as a mobile phone. The message divider 111 divides for the user terminal 3-1 an message 300 into, for example, three partial messages 201 to 203. The user terminal 3-2 is, for example, a tablet computer and a display size of the user terminal 3-2 is larger than the display size of the user terminal 3-1. For this reason, the partial message length determiner 116 determines for the user terminal 3-2 a partial message length upper limit longer than the partial message length upper limit determined for the user terminal 3-1. Therefore, the message divider 111 divides for the user terminal 3-2 the same message 200 into, for example, two partial messages 204 and 205. Thus, the partial messages that each have a length suitable for the size of the message display area of each user terminal 3 are generated.

The message enqueuing unit 112 puts the plurality of partial messages generated through division by the message divider 111 into a queue (enqueuing). Specifically, the message enqueuing unit 112 generates a queue 11d for a user terminal 3 to which the messages will be sent in the RAM 11c. The queue 11d is required to have a structure wherein the partial messages can be put in and taken out by first in first out. The message enqueuing unit 112 puts the plurality of partial messages in the queue 11d according to the order of the partial messages, from a partial message corresponding to the beginning of the original message to a partial message corresponding to the endo of it. Thereby, the order of the partial messages in the original message is maintained. As shown in FIG. 4A, with respect to the plurality of partial messages 201 to 203, the message enqueuing unit 112 puts the partial message 201 in the queue 11d first, puts the partial message 202 in the queue 11d second, and puts the partial message 203 in the queue 11d third.

Figure 5:
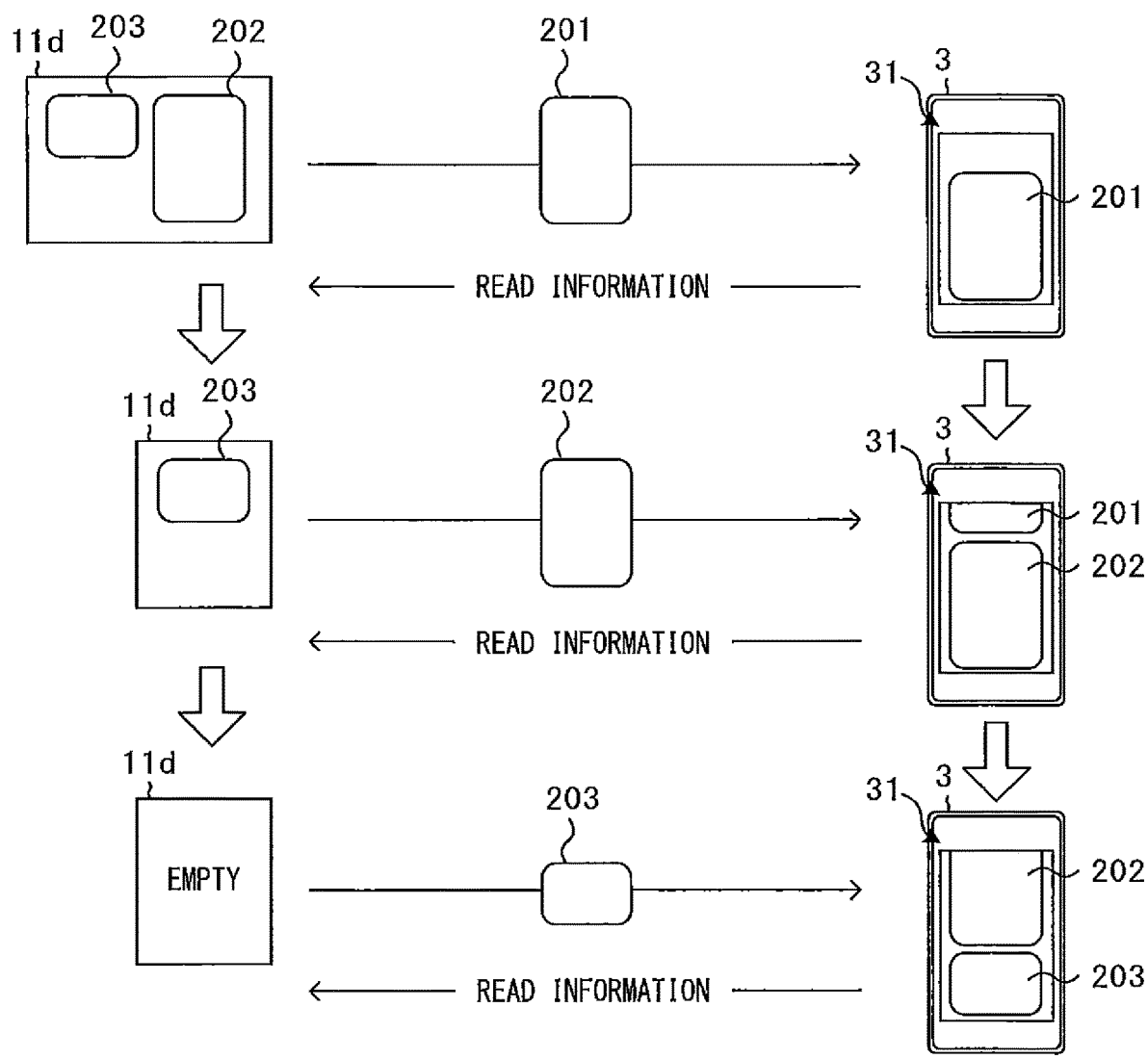
FIG. 5 is a diagram illustrating an example of a way in which partial messages and read information are sent and received.

The message sender 113 takes one partial message out of the queue among the plurality of partial messages put in the queue, and sends the one partial message to the user terminal 3 through the message management server 2. The partial message to be taken out first is the partial message corresponding to the beginning of the original message. FIG. 5 is a diagram illustrating an example of a way in which partial messages and read information are sent and received. For example, as shown in FIG. 4a, assume that the partial messages 201 to 203 have been stored in the queue 11d. The message sender 113 takes the partial message 201 out of the queue 11d and sends the partial message 201 first. The user terminal 3 positions, by automatic scrolling, the end of the partial message 201 at the bottom of the message display area 31. The partial message 201 is displayed completely in the message display area 31 because the length of the partial message 201 is equal to or less than the partial message length upper limit. The user's scrolling operation is unnecessary.

The read information receiver 114 receives read information indicating that the partial message sent by the message sender 113 has been displayed in the message display area of the user terminal 3 to which it has been sent. The read information is sent from the user terminal 3 to the bot server 1 through the message management server 2. If the read information is not sent under a specification of the messaging system SA, the message sender 113 may, for example, embed a web beacon in the partial message that will be sent. For example, a URL in an image tag of the web beacon includes IP address assigned to the bot server 1. Therefore, when having displayed the received partial message in the message display area, the user terminal 3 sends a request for an image to the bot server 1. The read information receiver 114 may regard this request as the read information.

After the read information is received by the read information receiver 114, the message sender 113 takes a next partial message out of the queue 11d among the plurality of the partial messages, and sends the next partial message to the user terminal 3 through the message management server 2. As described above, the user terminal 3 send the read information when having displayed the message in the message display area. Accordingly, it ensures that the first sent partial message is completely displayed in the message display area before the user terminal 3 receives and displays the next partial message. For example, as shown in FIG. 5, after the read information is sent from the user terminal 3 to the bot server 1 in response to sending the partial message 201, the message sender 113 takes the partial message 202 out of the queue 11d and sends the partial message 202. The user terminal 3 automatically scrolls through the received partial message 202 and the already-displayed partial message 201 to position the end of the partial message 202 at the bottom of the message display area. Similar to described above, the partial message 202 is displayed completely in the message display area 31 because the length of the partial message 202 is equal to or less than the partial message length upper limit. Since the user's scrolling operation is unnecessary at this time too, the user can view the original message quickly. It does not matter if a part or the whole of the partial message 201 is disappeared from the message display area 31.

Similar to described above, the read information receiver 114 further receives read information indicating that the next partial message sent by the message sender 113 has been displayed in the message display are. When there are three or more partial messages, the message sender 113 further takes, after this read information is received by the read information receiver 114, a partial message after the next out of the queue 11d among the plurality of the partial messages, and sends the partial message. Such the reception of the read information and the transmission of the partial message are repeated until the queue 11d become empty. For example, as shown in FIG. 5, after the read information is sent from the user terminal 3 to the bot server 1 in response to sending the partial message 202, the message sender 113 takes the partial message 203 out of the queue 11d and sends the partial message 203. The user terminal 3 automatically scrolls through the received partial message 203 and the already-displayed partial messages 201 and 203 to position the end of the partial message 203 at the bottom of the message display area. The whole of the partial message 203 is displayed in the message display area 31. read information is sent from the user terminal 3 to the bot server 1 in response to sending the partial message 203. Since the queue 11d is empty at this time, the transmission of the partial messages ends.

The message sender 113 may send the next partial message after a predetermined waiting time elapses from when the read information is received. The waiting time is a time that elapses until the next message is sent. This waiting time corresponds to a time elapses from when a partial message is displayed in the message display area to when a next partial message is displayed. This provides a time to read the previous partial message for a user until the next partial message is displayed. It is desirable that the waiting time be set so that the next message is displayed at a timing when the user finishes reading the partial message or a few seconds after the user finishes reading the partial message.

While a waiting time that is common to all users may be preset, the waiting time may be set for each user. Therefore, the operation history obtainer 117 obtains a history of predetermined operations by a user with respect to the instant messenger. The operation recorded in this operation history may be, for example, an operation that suggests the user has finished reading the message. As examples of this operation, scrolling through the message, inputting or sending a message responding to a received message, switching between screens of the instant messenger, and terminating the instant messenger are listed. In a case in which the message management server 2 serves as the bot server 1, the message management server 2 may receive information notifying that the predetermined operation has been performed from the terminal 3 when the user has performed any of these operations. The message sender 113 stores, as a piece of the operation history, a time when the bot server 1 receives the information notifying that the predetermined operation has been performed in the storage unit 14 in association with identification information of an account of the user. In a case in which the bot server 1 is different to the message management server 2, the message sender 113 may store, as a piece of the operation history, a time when the bot server 1 receives a reply message in the storage unit 14, in association with the identification information of the account of the user. The reply message is sent from the user terminal 3 to the bot server 1 when the user inputs the replay message in response to a message sent by the bot server 1. The message sent by the bot server 1 may be a final partial message among the plurality of generated partial messages. For example, when a predetermined number of or more pieces of operation history has been stored in the storage unit 14 or every time a piece of the operation history has been stored, the operation history obtainer 117 obtains the operation history of a targeted user.

The waiting time determiner 118 determines the waiting time based on the operation history obtained by the operation history obtainer 117. For example, the waiting time determiner 118 may calculate, for each piece of the operation history, a time that elapsed from when read information was received from a user terminal 3 of the targeted user to when the predetermined operation was performed (to when the reply message was received from the user terminal 3). The waiting time determiner 118 may determine the waiting time to be a representative value of the elapsed times. The representative value may be, for example, a mean or a median, or may be calculated using an expression: mean+ standard deviation×coefficient (the coefficient is a predetermined real number) or so forth. It is desirable that the waiting time determiner 118 determine the waiting time with excluding elapsed times that are extremely long as outlier, since the user may leave the user terminal 3 after a message is displayed. The waiting time determiner 118, for example, stores the determined waiting time in the storage unit 14 in association with the identification information of the account of the targeted user.

[1-4. Messaging System Operation]

Figure 6:
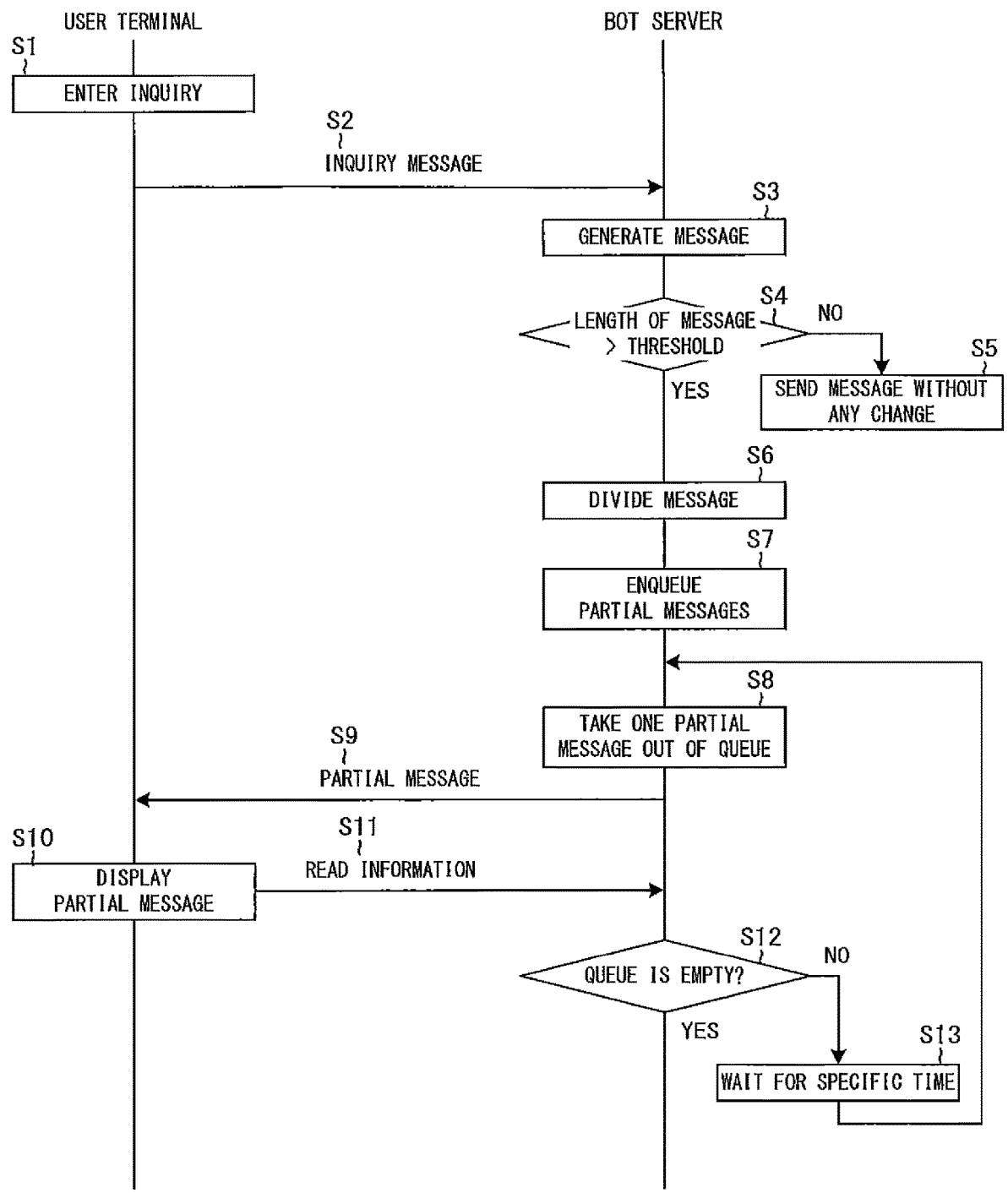
FIG. 6 is a sequence diagram illustrating an example operation of the messaging system SA.

Next, the operation of the messaging system SA will be described with reference to FIG. 6. FIG. 6 is a sequence diagram illustrating an example operation of the messaging system SA. The process by the bot server 1 in FIG. 6 is performed according to various types of codes included in the internet bot program stored in the storage unit 14. Although the partial messages and the read information are sent and received through the message management server 2 if the bot server 1 is different to the message management server 2, a process by the message management server 2 is omitted in FIG. 6.

As shown in FIG. 6, a user first enters some kind of inquiry message to the bot server 1 (Step S1). Thereon the user terminal 3 sends the entered inquiry message to the bot server 1 (Step S2). The bot server 1 generates a reply message according to the inquiry message (Step S3). Next, the bot server 1 determines whether a length of the generated message is more than the threshold (Step S4). When determining that the length of the message is equal to or less than the threshold (Step S4: NO), the bot server 1 sends the generated message without any change to the user terminal 3 (Step S5).

On the other hand, when determining that the length of the message is more than the threshold (Step S4: YES), the bot server 1 divides the generated message into partial messages that each have a length equal to or less than the partial message length upper limit (Step S6). As described before, this partial message length upper limit may be predetermined or may be determined based on the size information on the user terminal 3 that has sent the inquiry message. The bot server 1 puts the plurality of partial messages into the queue 11$d$ (Step S7).

Next, the bot server 1 takes one partial message out of the queue 11$d$ and sends the partial message to the user terminal 3 (Steps S8 and S9). The user terminal 3 displays the received partial message in the message display area and sends read information to the bot serve 1 (Steps S10 and S11).

When receiving the read information, the bot server 1 determines whether the queue is empty (Step S12). When determining that the queue is not empty (Step S12: NO), the bot server 1 waits for the specific waiting time (Step S13). As described before, this waiting time may be predetermined or may be determined based on an operation history on the user who has sent the read information. Next, the bot server 1 takes another partial message out of the queue 11$d$ and sends the partial message to the user terminal 3 (Steps S8 and S9). On the other hand, when determining that the queue is empty (Step S12: YES), the bot server 1 ends sending of the partial messages. Thus, Steps S8 to S13 are repeated until the queue 11$d$ becomes empty.

As described above, according to the present embodiment, the system controller 11 divides the original message that should be sent to the user terminal 3 into the plurality of partial messages that each have a length equal to or less than the partial message length upper limit. The system controller 11 puts the plurality of partial messages in the queue 11$d$. The system controller 11 takes one partial message out of the queue 11$d$ among the plurality of partial messages and sends the one partial message to the user terminal 3. The system controller 11 receives the read information indicating that the sent partial message has been displayed in the display area. The system controller 11 takes a next partial message out of the queue 11$d$ among the plurality of partial messages and sends the next partial message to the user terminal 3 after the read information is received. Therefore, a user can see each partial message completely. As a result, the user can substantially see the whole of the original message without manual scrolling.

In addition, the system controller 11 may obtain the history of operations by the user with respect to the instant messenger in the user terminal 3. The system controller 11 may determine, based on the obtained history, the waiting time until sending the next partial message. The system controller 11 may send the next partial message the determined waiting time or more after the read information is received. In this case, it is possible to appropriately determine for each user a timing of sending the next message. As a result, it is possible to increase a probability that the user terminal 3 displays the next partial message after the user finishes reading the first partial message.

In addition, the system controller 11 may obtain the size information indicating a size of the display area. The system controller 11 may determine, based on the received size information, the partial message length upper limit. The system controller 11 may divide the original message into the plurality of partial messages according to the determined partial message length upper limit. In this case, when sizes of display areas vary depending on the user terminals 3, it is possible to divide the original message into partial messages that each have a suitable length according to the size of the display area.

In addition, the system controller 11 may divide the original message into the plurality of partial messages when a length of the original message is more than the threshold. On the other hand, when the length of the original message is equal to or less than the threshold, the system controller 11 may send the original message to the user terminal 3 without dividing the message. In this case, when the length of the original message is a length that makes it possible to display the whole of this message in the display area at once, the user terminal 3 can display the whole of the original message at once.

In addition, the system controller 11 may further receive the read information indicating that the sent next partial message has been displayed in the display area. The system controller 11 may take the partial message after the next out of the queue 11*d* among the plurality of partial messages and send the next partial message to the user terminal 3 after the read information is received. The system controller 11 may repeat the reception of the read information and the transmission of the partial message until the queue 11*d* becomes empty. In this case, when the original message has been divided into three or more partial messages, each partial message is displayed in the display area completely. Therefore, the user can substantially see the whole of the original message without manual scrolling.

2. Second Embodiment

Next, the second embodiment will be described with reference to FIGS. 7A and 7B. The second embodiment is the same as the first embodiment except for points described below.

While the present invention is, in the first embodiment, applied to the messages automatically sent by the Internet bot (the bot server 1), the present invention is, in the second embodiment, applied to messages that are sent and received between the user terminals 3.

Figure 7A:
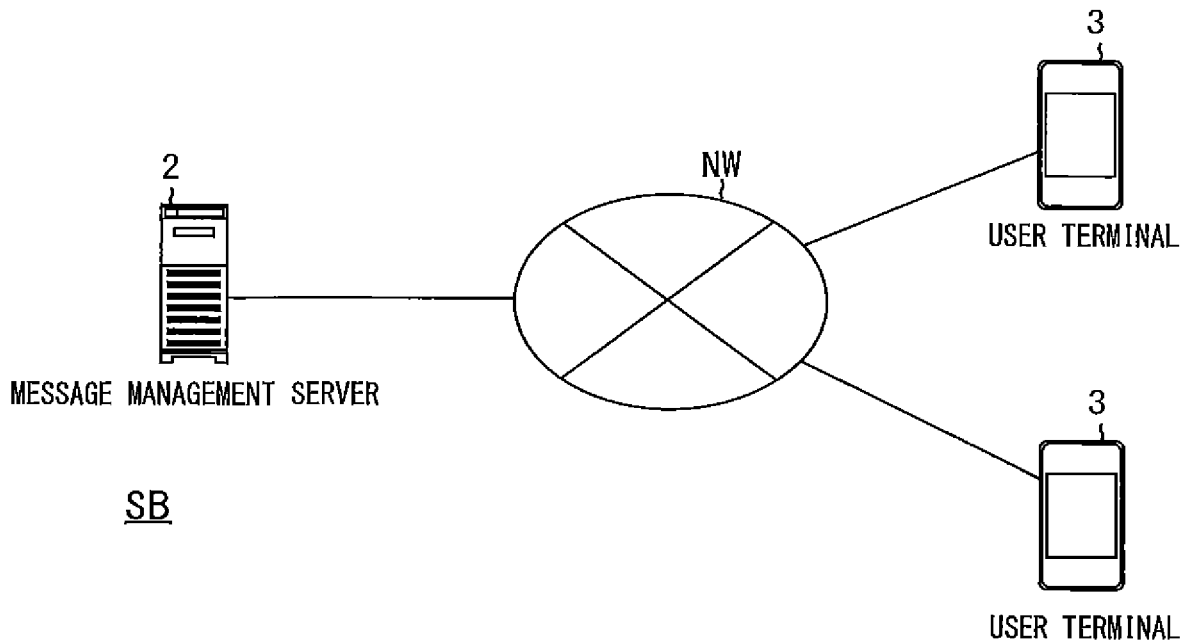
FIG. 7A is a diagram schematically illustrating an example configuration of a messaging system SB according to one embodiment.
Figure 7B:
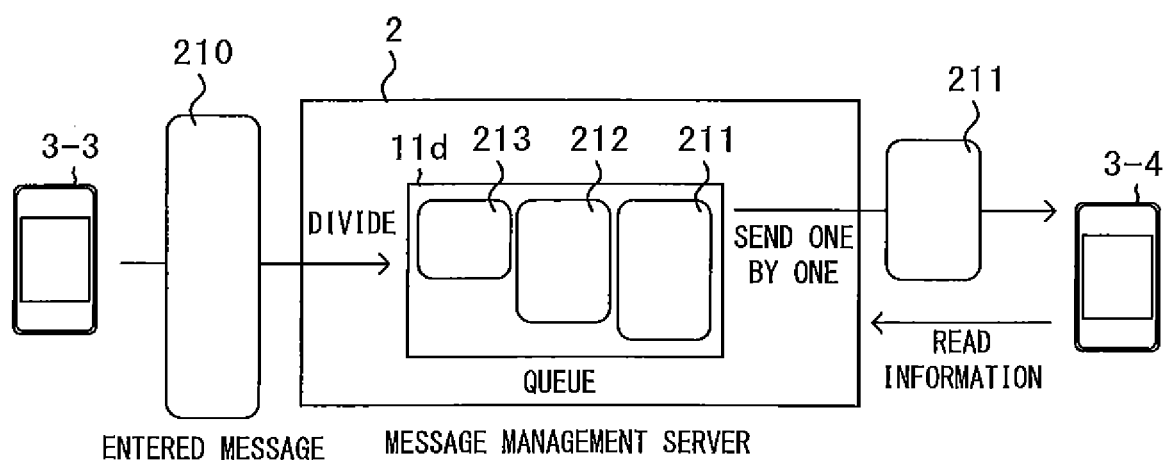
FIG. 7B is a diagram schematically illustrating an example operation of the messaging system SB.

FIG. 7A is a diagram schematically illustrating an example configuration of a messaging system SB according to one embodiment. In FIG. 7A, the same components as FIG. 1 are denoted by the same reference signs. As shown in FIG. 7A, the messaging system SB includes the message management server 2, and the plurality of user terminals 3. The message management server 2 and the user terminals 3 are capable of transmitting and receiving data with each other over the network NW. A configuration of the message management server 2 is the same as the configuration shown in FIG. 3A. Functional blocks of the system controller 11 in the message management server 2 are the same as the functional blocks shown in FIG. 3B.

When relaying a message sent from a user terminal 3 to another user terminal 3, the message management server 2 divides this message into a plurality of partial messages and sends the plurality of partial messages one by one. FIG. 7B is a diagram schematically illustrating an example operation of the messaging system SB. For example, as shown in FIG. 7B, a user of a user terminal 3-3 enters a message 210 that is to be sent to a user of a user terminal 3-4. The user terminal 3-3 sends the message 210 to the message management server 2. When a length of the message 210 is equal to or less than the threshold, the message management server 2 sends the message 210 without any change to the user terminal 3-4. On the other hand, when the length of the message 210 is more than the threshold, the message management server 2 divides the message 210 into, for example, partial messages 211 to 213 that each have a length equal to or less than the partial message length upper limit. The message management server 2 puts the partial messages 211 to 213 in queue 11*d*. The message management server 2 takes the partial message 211 out of the queue 11*d* and sends the partial message 211 to the user terminal 3-4. After receiving read information from the user terminal 3-4, the message management server takes the partial message 212 out of the queue and sends the partial message 212 to the user terminal 3-4. After further receiving read information from the user terminal 3-4, the message management server takes the partial message 213 out of the queue and sends the partial message 213 to the user terminal 3-4.

As described above, according to the present embodiment, the user can see, without manual scrolling, the whole of the message that is sent and received between the user terminals 3.

REFERENCE SIGNS LIST

1 bot server
2 message management server
3, 3-1, 3-2, 2-3, 3-4 user terminal
11 system controller
12 system bus
13 input/output interface
14 storage unit
15 communication unit
11*d* queue
14*d* message DB
111 message divider
112 message enqueuing unit
113 message sender
114 read information receiver
115 display area size obtainer
116 partial message length determiner
117 operation history obtainer
118 waiting time determiner
NW network
SA, SB messaging system

The invention claimed is:

1. A sending device for sending a message to a receiving device that displays the message in a display area, the sending device comprising:
at least one memory configured to store computer program code; and
at least one processor configured to access the computer program code and operate as instructed by the computer program code, the computer program code including:

dividing code configured to cause at least one of the at least one processor to divide the message into a plurality of partial messages, each of the plurality of partial messages having a length equal to or less than a predetermined length;

enqueuing code configured to cause at least one of the at least one processor to put the plurality of partial messages in a queue;

first sending code configured to cause at least one of the at least one processor to take one partial message among the plurality of partial messages out of the queue and send the one partial message to the receiving device;

receiving code configured to cause at least one of the at least one processor to receive a notification, from the receiving device, that the sent partial message has been displayed in the display area, the notification being automatically sent to the sending device when the sent partial message has been displayed in the display area; and second sending code configured to cause at least one of the at least one processor to take a next partial message among the plurality of partial messages out of the queue and send the next partial message to the receiving device based on the notification being received, wherein the second sending code is further configured to cause at least one of the at least one processor to send the next partial message at a predetermined time or more after the notification is received by the sending device.

2. The sending device according to claim 1, further comprising:

history obtaining code configured to cause at least one of the at least one processor to obtain a history of operations performed by a user with respect to an instant messenger in the receiving device; and time determining code configured to cause at least one of the at least one processor to determine a time for sending the next partial message based on the history of operations, wherein the second sending code is further configured to cause at least one of the at least one processor to send the next partial message at the determined time or more after the notification is received by the sending device.

3. The sending device according to claim 1, further comprising:

size information obtaining code configured to cause at least one of the at least one processor to obtain size information indicating a size of the display area; and length determining code configured to cause at least one of the at least one processor to determine an upper limit of a length per partial message based on the size information, wherein the dividing code is further configured to cause at least one of the at least one processor to divide the message into the plurality of partial messages, each of the plurality of partial messages having the length equal to or less than the determined upper limit of the length.

4. The sending device according to claim 1, wherein the dividing code is further configured to cause at least one of the at least one processor to divide the message into the plurality of partial messages when a length of the message is more than a second predetermined length, and the first sending code is further configured to cause at least one of the at least one processor to send the message to the receiving device without dividing the message when the length of the message is less than a second predetermined length.

5. The sending device according to claim 1, wherein the dividing code is further configured to cause at least one of the at least one processor to divide the message into the plurality of partial messages when a display size of the message is larger than a size of the display area, and the first sending code is further configured to cause at least one of the at least one processor to send the message to the receiving device without dividing the message when the display size of the message is equal to or less than the size of the display area.

6. The sending device according to claim 1, wherein each time any one of the plurality of partial messages sent to the receiving device has been displayed in the display area of the receiving device, another notification is automatically sent to the sending device, and each time the sending device receives the another notification, the second sending code is further configured to cause at least one of the at least one processor to take another partial message among the plurality of partial messages out of the queue as long as the queue contains at least one partial message and send the another partial message to the receiving device.

7. The sending device according to claim 1, wherein a display size of each of the plurality of partial messages is equal to or less than a size of the display area.

8. A sending method executed by a computer in a sending device for sending a message to a receiving device that displays the message in a display area, the sending method comprising:

dividing the message into a plurality of partial messages, each of the plurality of partial messages having a length equal to or less than a predetermined length;

putting the plurality of partial messages in a queue;

taking one partial message among the plurality of partial messages out of the queue and sending the one partial message to the receiving device;

receiving a notification, from the receiving device, that the sent partial message has been displayed in the display area, the notification being automatically sent to the sending device when the sent partial message has been displayed in the display area; and taking a next partial message among the plurality of partial messages out of the queue and sending the next partial message to the receiving device based on the notification being received, wherein the next partial message is sent at a predetermined time or more after the notification is received by the sending device.

9. A non-transitory computer readable medium storing thereon a sending program for a sending device for sending a message to a receiving device that displays the message in a display area, the sending program causing at least one processor in the sending device to:

divide the message into a plurality of partial messages, each of the plurality of partial messages having a length equal to or less than a predetermined length;

put the plurality of partial messages in a queue;

take one partial message among the plurality of partial messages out of the queue and send the one partial message to the receiving device;

receive a notification, from the receiving device, that the sent partial message has been displayed in the display area, the notification being automatically sent to the sending device when the sent partial message has been displayed in the display area; and take a next partial message among the plurality of partial messages out of the queue and send the next partial message to the receiving device based on the notification being received, wherein the next partial message is sent at a predetermined time or more after the notification is received by the sending device.

10. The sending device according to claim 1, wherein the dividing code is further configured to cause at least one of the at least one processor to divide the message into the plurality of partial messages at a predetermined character in the message.

11. The sending device according to claim 1, wherein the dividing code is further configured to cause at least one of the at least one processor to adjust the length of the partial messages based on blanks included in the message.

12. The sending device according to claim 1, wherein an end of the next partial message is positioned at a bottom of the display area.

13. The sending device according to claim 1, wherein the first sending code configured is further configured to cause at least one of the at least one processor to take one partial message among the plurality of partial messages out of the queue and send the one partial message to the receiving device until the queue is empty.

14. The sending device according to claim 1, wherein the computer program code further includes size information obtaining code configured to cause at least one of the at least one processor to obtain size information indicating a size of the display area from the receiving device, and wherein the dividing code is further configured to cause at least one of the at least one processor to divide the message into the plurality of partial messages based on the size of the display area.

* * * * *